No. 783,992. PATENTED FEB. 28, 1905.
A. BLONDEL.
WIRELESS TELEGRAPHY BY ELECTRIC WAVES.
APPLICATION FILED JULY 7, 1903.
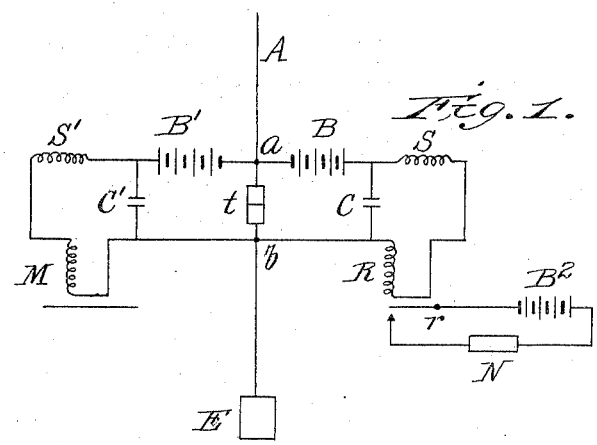
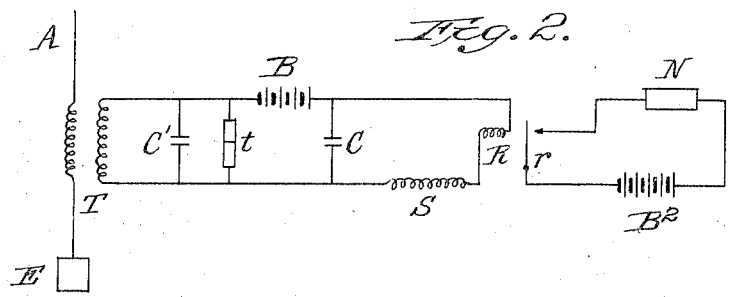
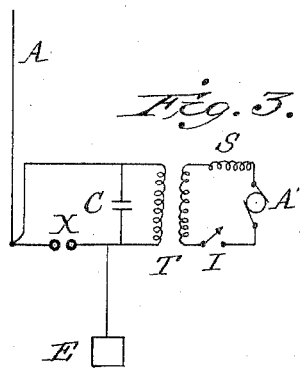
Witnesses.
Edwin L. Yewell
F. T. Chapman
Inventor:
André Blondel
By Lyons & Bissing
Attorneys.

No. 783,992.

Patented February 28, 1905.

UNITED STATES PATENT OFFICE.

ANDRÉ BLONDEL, OF PARIS, FRANCE.

WIRELESS TELEGRAPHY BY ELECTRIC WAVES.

SPECIFICATION forming part of Letters Patent No. 783,992, dated February 28, 1905.

Original application filed December 3, 1900, Serial No. 38,539. Divided and this application filed July 7, 1903. Serial No. 164,580.

*To all whom it may concern:*

Be it known that I, ANDRÉ BLONDEL, engineer, a citizen of the Republic of France, residing at Paris, France, have invented new and useful Improvements in Wireless Telegraphy by Electric Waves; and I do hereby declare the following to be a full, clear, and exact description of the same.

My invention has reference to improvements in wireless telegraphy, the object being the selective reception at a given station of a signal or message transmitted from one of a number of transmitting-stations or the simultaneous selective reception at one station of two or more messages coming from two or more transmitting-stations, and this application is a division of my prior application, Serial No. 38,539, filed December 3, 1900.

Prior to my invention it has been attempted to accomplish the selective reception at a receiving-station of signals emitted at one of a number of distant transmitting-stations by electrically tuning the receiving mast-wire or the receiving-circuit in unison with the periodicity of the electromagnetic waves emitted at such transmitting-station. The difficulties encountered in such systems are now well recognized, and they can mainly be traced to the fact that it is practically impossible to obtain accurate syntony between two mast-wires, because of the enormous frequency of the electromagnetic waves emitted by one and to be selectively absorbed by the other.

In accordance with my invention syntony between the transmitting and receiving mast-wires is not aimed at and is not utilized. The characteristic feature of the invention herein claimed is to mechanically tune the receiving apparatus in unison with the frequency of groups of electromagnetic waves emitted from a transmitting station or stations, whereby signals coming from different stations are mechanically and electrically selected, the mechanical selection being accomplished by acoustically-tuned receiving apparatus and the electrical selection being accomplished by electrically-tuned receiving-circuits in which the mechanically-tuned receivers are located, so that no electrical tuning of the receiving mast-wire becomes necessary, although such tuning is not necessarily excluded. It is also evident that when the receiving-circuits are accurately tuned to the group frequencies of the incoming waves the receiving apparatus need not necessarily be acoustically tuned, although such tuning will always improve the selectivity of the receiver.

In the accompanying drawings, which form a part of this specification, my invention is illustrated as follows:

Figure 1 represents a diagram of the equipment of a receiving-station in accordance with my invention. Fig. 2 represents a diagram of another equipment of receiving-station in accordance with my invention, and Fig. 3 is a diagram of the equipment of a transmitting-station.

Like letters of reference indicate like parts in the drawings.

Electromagnetic waves which proceed from the mast-wire of a transmitting-station in a system of wireless telegraphy are due to the charges and discharges of an oscillator of the Hertz type. These waves occur in groups, and each group is composed of a number of waves which become very rapidly enfeebled, the first wave of each group being of comparatively great amplitude and the following waves of each group being rapidly reduced in amplitude by the dampening effects to which they are subjected, so that the periods between the successive discharges of the oscillator comprise intervals in which there are practically no waves emanating from the mast-wire, and these intervals of low oscillation form a large fraction of the period between two successive discharges. At the receiving-station the electromagnetic waves arrive considerably weakened; but there the waves of each group do not usually fade out altogether, although they fade out very much. The wave frequencies are extremely high, going into the millions per second, while the group frequencies, which correspond to the frequencies of the discharges at the transmitting-oscillator, are naturally very much lower.

Prior to my invention it was attempted to tune the mast-wire or the circuit at the receiving-station in unison with the wave frequency of one transmitting-station, so as to receive and respond to such frequency and to receive and respond to no other frequency; but in accordance with my invention the receiving-station takes no selective notice of the wave frequency. It receives waves of all frequencies; but the receivers respond only to the group frequencies of such waves, making one movement or one vibration in response to each group of waves.

An essential requisite for the practice of my invention is that at each transmitting-station there be a means for producing electrical discharges of the desired frequency or frequencies and that the discharges be disruptive, as distinguished from discharges which merge into each other. It is within my invention to use any of the means afforded by the art to accomplish this result; but I have found the equipment diagrammatically indicated in Fig. 3 particularly effective. In this figure of the drawings is shown an induction-coil or transformer T, in the primary circuit of which is an alternating-current dynamo A' and a key I for closing and opening the circuit. The secondary circuit includes the two oscillator-balls X, set at the proper striking distance, which forms the spark-gap. From one of these oscillator-balls extends the mast-wire A and from the other the ground connection E. An arrangement of the kind so far described has been found in practice to give rather poor results, since the discharges between the oscillator-balls are not distinctly and sharply disruptive, particularly when the periodicity of the alternating-current dynamo is high. It has been found in such cases that the discharges merge into each other and tend to form and maintain an electric arc. For the purposes of my invention the formation of an arc at the oscillator is inadmissible, and in order to prevent this I place in the secondary circuit a condenser C of suitable capacity in shunt around the spark-gap. The induction-coil or transformer T used in this arrangement is so chosen as to give an elevated potential in the secondary circuits, say, anywhere from twenty-five thousand up to one hundred thousand volts. With such high potentials the condenser C must of course be properly constructed so as not to break down under the high pressure. By adjusting the speed and electromotive force of the alternator, the inductance of the primary circuit by the inductance-coil S, and the capacity of the condenser C in the secondary circuit the number of discharges at the spark-gap can be adjusted to a nicety. If once the adjustment is made, the frequency of discharges of the spark-gap remains invariable.

I am not confined in the practice of my invention to the use of the identical arrangement here shown for producing a definite frequency of discharges at the transmitting-stations. Any other well-known or improved means for obtaining this result may be used for this purpose. All that is required is that there be produced at each station a different but fixed number of electrical discharges. Thus, for instance, in place of the alternating-current dynamo A' there may obviously be used a battery and a circuit-breaker. The range of frequencies practically available in my system is rather wide and depends largely upon the particular receiving apparatus used in a given case.

One equipment of a receiving-station is indicated in Fig. 1, where A is the mast-wire, E the ground, and $t$ a self-restoring coherer included in the mast-wire and ground connection. The coherer is shunted at the points $a\ b$ by two circuits, one containing the battery B, the inductance-coil S, the relay-magnet R, and the condenser C in shunt and the other containing the battery B', inductance-coil S', the telephone-magnet M, and the condenser C' in shunt. These two circuits are only specimens, since more than two such circuits or only one such circuit may be thrown around the coherer. These branch circuits are tuned each to a different group frequency by the condensers and inductance-coils. As here shown, the relay-magnet R in one of these branch circuits controls a vibrating reed $r$, tuned in unison with the circuit of its controlling-magnet and itself controlling the local circuit of the battery $B^2$, containing any suitable electromagnetic receiver N, such as a sounder or recorder, while the other branch circuit operates the telephone M, which may or may not be, but preferably is, a monotelephone of any kind—such, for instance, as the monotelephone shown in the United States patent to Mercadier, No. 447,194, dated February 24, 1891. If the telephone employed is of this character, then it is tuned in unison with the branch circuit which controls it.

With a receiving-station equipped as above described with reference to Fig. 1 we may suppose two transmitting-stations equipped in the manner shown in Fig. 3 or in any other equivalent manner at distant points and that the frequencies or discharges produced at the two transmitting-stations be, say, five hundred and nine hundred, respectively. With such outlying transmitters the two receiving-circuits would be tuned, respectively, to respond to five hundred and nine hundred electrical impulses per second. The reed $r$ of the relay would then be mechanically tuned to the frequency of the circuit which controls it—say five hundred—and the diaphragm of the telephone M might be tuned to the frequency nine hundred. If now at the transmitting-station which has the frequency five hundred the Morse key I be operated, the mast-wire at that station will emit five hundred groups of electromagnetic waves per second so long as the key is closed. These groups of electromagnetic waves would be absorbed by the mast-wire of the receiving-station, and the resistance of the self-restoring coherer would be varied with the frequency of the waves emitted at the transmitter, but in the manner hereinbefore explained—that is to say, the resistance of the coherer, and consequently of both receiving-circuits in which it is jointly included, would be varied a vast number of times; but these variations themselves would periodically decrease and increase five hundred times per second, and variations of current in the receiver-circuit which is tuned to this rate—namely, the circuit of the relay-magnet R—would become very much pronounced and even violent, so that the relay-armature $r$ would be violently vibrated, and since this armature is itself tuned to the rate of five hundred per second it will close and open the local circuit containing the electromagnetic receiver N five hundred times per second. Therefore if the transmitting-key I is actuated in accordance with a certain code—say the Morse code—the message thus transmitted will be spelled out by the receiver N. The resistance of the branch circuit containing the telephone-magnet will also be varied five hundred times per second; but owing to the fact that this circuit is tuned to a different rate—to the rate of nine hundred per second—the variations of current in this circuit will be exceedingly small and will not be sufficient to actuate the diaphragm of the telephone, and particularly if this telephone is a monotelephone, whose diaphragm is also tuned to the rate of nine hundred per second. Thus it will be seen that the circuit of the relay-magnet will absorb and reinforce the message transmitted from the transmitting-station tuned to five hundred per second and that the relay-armature will powerfully respond to such message, while the circuit of the telephone will practically reject such message. If, on the other hand, a message comes from the transmitter tuned to the rate of nine hundred per second, such message will be absorbed and reinforced by the circuit of the telephone, and the latter, particularly if it is a monotelephone, will be powerfully operated, while the same message will be practically rejected by the circuit of the relay. Again, if both outlying transmitter-stations send messages at the same time one of these will be received selectively by the relay and the other by the telephone.

In the arrangement shown in Fig. 2 the mast-wire does not contain the coherer, but contains the primary of a transformer T, the secondary of which is in a local circuit containing the coherer $t$ and the condenser C' in shunt, and this condenser has such capacity as to tune this secondary circuit in unison with the wave frequency employed at the transmitting-station in conjunction with which it is designed to work. Around the coherer $t$ is thrown a branch circuit containing a battery B, a relay-magnet R, an inductance-coil S, and a condenser C in shunt. This branch circuit is tuned to the group frequency employed at the transmitting-station in conjunction with which it is designed to work, and a relay-magnet R controls a vibrating reed $r$, tuned to this group frequency and controlling the local circuit of the battery $B^2$, containing the sounder or recorder N. With this arrangement the primary of the inductorium T, which through the mast-wire receives without selection the waves of all frequencies employed at several transmitting-stations, transfers selectively to the tuned secondary circuit only the waves having the frequency employed at one of the transmitting-stations, varying the resistance of the coherer at this rate; but the branch thrown around the coherer and which contains the battery B, being tuned to the group frequency of the aforesaid transmitting-station, will receive pronounced electrical variations only at that frequency and will therefore act upon the reed of the relay only at that rate—that is to say, at the same rate to which the reed itself is tuned.

When telephones or other acoustical receivers are used, so as to tell the message by the notes which they emit, the frequency of the discharges at the transmitters must evidently be below the frequency of acoustical vibrations which produce the highest still audible note; nor must the number of discharges at the transmitting-station have a lower periodicity than that which corresponds to acoustical vibrations which give the deepest still audible note.

From the foregoing description it will be seen that my invention comprises certain methods of operation as well as the apparatus which I have here described for practicing the same. These methods, however, I do not herein claim.

What I claim, and desire to secure by Letters Patent, is—

1. A wireless-telegraph receiving equipment tuned to a definite group frequency of electromagnetic waves, substantially as described.

2. A wireless-telegraph receiving-circuit electrically tuned to a predetermined group frequency of electromagnetic waves, substantially as described.

3. In a system of wireless telegraphy a receiving-circuit adapted to absorb the energy of electromagnetic waves of predetermined group frequency, and a signaling device acoustically tuned to such group frequency, substantially as decribed.

4. The equipment of a wireless-telegraph receiving-station comprising a mast-wire adapted to absorb electromagnetic waves generated at a distant transmitting station or stations in groups of different frequencies, a circuit receiving electrical impulses from the mast-wire and electrically tuned to the frequency of one of the generated groups, and a receiving apparatus for that circuit, substantially as described.

5. The equipment of a wireless-telegraph receiving-station comprising a mast-wire adapted to absorb electromagnetic waves generated at a distant transmitting station or stations in groups of different frequencies, a plurality of circuits receiving electrical impulses from the mast-wire, each electrically tuned to a different one of the frequencies of the generated groups, and a receiving apparatus for each of these circuits, substantially as described.

6. The equipment of a wireless-telegraph receiving-station comprising a mast-wire adapted to absorb electromagnetic waves generated at a transmitting station or stations in groups of different frequencies, a circuit receiving electrical impulses from the mast-wire and electrically tuned to the frequency of one of the generated groups, and a signal-receiving device for the circuit acoustically tuned to the group frequency to which the said circuit is electrically tuned, substantially as described.

7. The equipment of a wireless-telegraph receiving-station comprising a mast-wire adapted to absorb electromagnetic waves generated at a distant transmitting station or stations in groups of different frequencies, a plurality of circuits receiving electrical impulses from the mast-wire, each electrically tuned to a different one of the frequencies of the generated groups, and a signal-receiving device for each circuit acoustically tuned each to the group frequency to which its controlling-circuit is electrically tuned, substantially as described.

8. The equipment of a wireless-telegraph receiving-station comprising a mast-wire adapted to absorb electromagnetic waves of a predetermined frequency but of any number of different group frequencies, a circuit electrically tuned to the frequency of the waves absorbed by the mast-wire and receiving current impulses from the latter, a circuit joined to the first circuit and electrically tuned to one of the group frequencies of the waves absorbed by the mast-wire, and a signal-receiving device actuated or controlled by the last-named circuit, substantially as described.

9. The equipment of a wireless-telegraph receiving-station comprising a mast-wire adapted to absorb electromagnetic waves of different group frequencies, a circuit electrically tuned to a predetermined frequency of waves absorbed by the mast-wire and receiving current impulses from the latter, a circuit branched from the first circuit and electrically tuned to one of the group frequencies of the waves absorbed by the mast-wire, a relay actuated by the currents in the branch circuit and acoustically tuned in unison therewith, and a signaling device controlled by said relay, substantially as described.

10. A system of wireless telegraphy comprising a transmitter producing electromagnetic waves of a predetermined group frequency and a receiving-circuit absorbing the energy of such waves and actuating a signaling device acoustically tuned to the group frequency of the absorbed waves and controlled by a circuit electrically tuned to such group frequency, substantially as described.

In testimony whereof I have signed this specification in the presence of two subscribing witnesses.

ANDRÉ BLONDEL.

Witnesses:
AUGUSTUS E. INGRAM,
GEORGE E. LIGHT.